(12) United States Patent
Hutchinson et al.

(10) Patent No.: US 12,130,193 B2
(45) Date of Patent: Oct. 29, 2024

(54) PERTURBATOR SYSTEMS AND METHODS FOR GENERATING PERTURBATIONS WITH A KNOWN WAVEFORM AND AMPLITUDE TO A SYSTEM

(71) Applicant: Baker Hughes Holdings LLC, Houston, TX (US)

(72) Inventors: Patrick Hutchinson, Stateline, NV (US); Brian F. Howard, Reno, NV (US); David R. O'Connor, Gardnerville, NV (US)

(73) Assignee: Baker Hughes Holdings LLC, Houston, TX (US)

( * ) Notice: Subject to any disclaimer, the term of this patent is extended or adjusted under 35 U.S.C. 154(b) by 222 days.

(21) Appl. No.: 17/650,776

(22) Filed: Feb. 11, 2022

(65) Prior Publication Data

US 2022/0283046 A1 Sep. 8, 2022

Related U.S. Application Data

(60) Provisional application No. 63/158,011, filed on Mar. 8, 2021.

(51) Int. Cl.
*G01L 3/10* (2006.01)
(52) U.S. Cl.
CPC .................... *G01L 3/104* (2013.01)
(58) Field of Classification Search
CPC ....................................... G01L 3/104
See application file for complete search history.

(56) References Cited

U.S. PATENT DOCUMENTS

| | | | | |
|---|---|---|---|---|
| 9,476,783 B2* | 10/2016 | Frank | ......................... | G01L 3/08 |
| 9,608,484 B2* | 3/2017 | Cho | ...................... | H02K 1/2798 |
| 9,985,512 B2* | 5/2018 | Powell | ..................... | H02K 1/28 |
| 10,205,373 B2* | 2/2019 | Xu | ........................ | H02K 49/106 |
| 10,312,790 B2* | 6/2019 | Mostovoy | ............... | F16D 27/00 |
| 10,361,617 B2* | 7/2019 | Mueller | ............... | H02K 49/102 |
| 11,804,767 B2* | 10/2023 | Vogt | ..................... | H01F 7/0242 |
| 2008/0191572 A1* | 8/2008 | Roozee | ................ | H02K 49/106 29/428 |
| 2012/0098374 A1* | 4/2012 | Curbelo | ............... | H02K 49/106 310/103 |
| 2019/0267884 A1* | 8/2019 | Mostovoy | ............ | H02K 49/106 |

FOREIGN PATENT DOCUMENTS

| | | | | |
|---|---|---|---|---|
| CN | 111900857 A | * | 11/2020 | |
| EP | 0797286 A1 | * | 9/1997 | |
| JP | 2013517435 A | * | 5/2013 | |

* cited by examiner

*Primary Examiner* — Octavia Hollington
(74) *Attorney, Agent, or Firm* — Mintz, Levin, Cohn, Ferris, Glovsky and Popeo, P.C.

(57) ABSTRACT

Systems and methods for improved perturbation generation are provided. A perturbation generation system can include a first rotor and a second rotor. The first rotor can be configured to hold a first magnet and a second magnet. The second rotor can be configured to hold a third magnet and a fourth magnet. The first rotor can be rotatably and proximately arranged with the second rotor, where the first and second magnets can be configured to interact with the third and fourth magnets to create a force between the first rotor and the second rotor as the first rotor rotates relative to the second rotor.

20 Claims, 14 Drawing Sheets

PERTURBATOR SYSTEMS AND METHODS FOR GENERATING PERTURBATIONS WITH A KNOWN WAVEFORM AND AMPLITUDE TO A SYSTEM

CROSS-REFERENCE TO RELATED APPLICATIONS

This application claims priority to U.S. Provisional Application No. 63/158,011, filed Mar. 8, 2021, the disclosure of which is incorporated herein by reference in its entirety.

TECHNICAL FIELD

The current subject matter is generally related to perturbator systems and methods for generate perturbations with a known waveform and amplitude to a system.

BACKGROUND

Sensors can be used in a variety of industries to monitor equipment. As an example, torque sensors can be used to monitor rotating machine components (e.g., shafts) and output signals representative of torque applied to the monitored components. By comparing measured torques to design specifications, it can be determined whether monitored components are operating within these specifications.

In some instances, existing perturbator systems can require a known torque perturbation to be applied to the system. This arrangement requires axial, rotational, and torsional force to be applied to a rotating shaft with a controlled waveform and amplitude in order to properly calibrate any sensors of the system. Additionally, multiple separate actuators may be required in order to apply the axial, rotational, and torsional forces to the rotating shaft. Also, when an actuator is applied to the rotating shaft, the system may have to compensate for loses due to the added weight and friction from the actuator contacting the shaft, which could affect the perturbation data being collected by the sensors of the system.

SUMMARY

Implementations of the present disclosure present perturbator systems and corresponding methods that generate perturbations with a known waveform and amplitude to a system.

In an implementation, a system is provided and can include a first rotor and a second rotor. The first rotor can be configured to hold a first magnet and a second magnet. The second rotor can be configured to hold a third magnet and a fourth magnet. The first rotor can be rotatably and proximately arranged with the second rotor, where the first and second magnets can be configured to interact with the third and fourth magnets to create a force between the first rotor and the second rotor as the first rotor rotates relative to the second rotor.

In another implementation, the first rotor can be arranged concentrically within the second rotor.

In another implementation, the first and second magnets can interact with the third and fourth magnets to create a torsional force.

In another implementation, the first rotor can be non-rotatably secured to a first rotating shaft, and the second rotor can be non-rotatably secured to a second rotating shaft.

In another implementation, the first, second, third, and fourth magnets can be arranged within the same axial plane perpendicular to an axis of rotation.

In another implementation, the first rotor and the second rotor can be conically-shaped.

In another implementation, the first and second magnets can interact with the third and fourth magnets to create an axial and torsional force.

In another implementation, the first, second, third, and fourth magnets can be arranged at an angle between a range of 10° to 80° from an axis of rotation.

In another implementation, the first magnet, the second magnet, the third magnet, and the fourth magnet can be electromagnets configured to alter each of their respective magnetic fields.

In another implementation, the first rotor can be arranged axially to the second rotor and the first and second magnets can interact with the third and fourth magnets to create an axial force.

In another implementation, the first and second magnets can be arranged in a first axial plane, and the third and fourth magnets can be arranged in a second axial plane, where the first axial plane is distal to the second axial plane.

In another implementation, the system can further include a first drive motor configured to rotate the first shaft, a second drive motor configured to rotate the second shaft, and a sensor configured to measure the axial, torsional, and radial forces applied to the first shaft.

In another implementation, the first rotor can further include a fifth magnet and a sixth magnet, and the second rotor can further include a seventh magnet and an eighth magnet.

In another implementation, the first, second, fifth, and sixth magnets can be arranged 90° from each other about the first rotor, and the third, fourth, seventh, and eighth magnets can be arranged 90° from each other about the second rotor.

In another implementation, a method of perturbation generation is provided. The method can include rotating a first rotor including a first magnet and a second magnet arranged therein and rotating a second rotor including a third magnet and a fourth magnet arranged therein. The first rotor can be proximately arranged with the second rotor, where the first and second magnets can be configured to interact with the third and fourth magnets to create a force between the first rotor and the second rotor as the first rotor rotates relative to the second rotor.

In another implementation, the first rotor rotates in a first direction at a first speed, and the second rotor rotates in a second direction at a second speed resulting in torsional forces in the first, third, fifth force and radial forces in the second, fourth, sixth force in a frequency domain.

In another implementation, wherein the pole orientation of the at least one magnet has been altered, and the first rotor rotates in a first direction at a first speed and the second rotor rotates in a second direction at a second speed resulting in torsional forces in the first, second, third force and radial forces at the second, fourth, sixth force in a frequency domain.

In another implementation, the first force and the second force can be torsional forces.

In another implementation, the first force and the second force can be axial forces.

In another implementation, the first or second rotor is stopped.

In another implementation, the first direction can be opposite the second direction.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

These and other features will be more readily understood from the following detailed description taken in conjunction with the accompanying drawings, in which.

It is noted that the drawings are not necessarily to scale. The drawings are intended to depict only typical aspects of the subject matter disclosed herein, and therefore should not be considered as limiting the scope of the disclosure.

DETAILED DESCRIPTION

Perturbation systems for generating perturbations for calibrating torsional, axial, and radial force sensors can be used to calibrate the sensors prior to installation into a system. In order to calibrate sensors, known perturbations need to be applied to a system for the sensors to detect. Applying know perturbations to a system at a high enough frequency to replicate specific force on a real-world system can be problematic. As used herein, a perturbation is defined as a radial, axial, or torsional force applied to the system. In general, the characteristics of a perturbation system include creating perturbations with known amplitude and wave forms in order to compare the recorded data from the sensors with the known values. Accordingly, improved perturbation systems and methods for generating perturbations in a system are provided. The improved perturbation system can include permanent and/or electromagnets magnets arranged within a perturbator, where the perturbator includes two rotors which can rotate relative to one another. As a result, such systems and methods are able to produce known perturbations along the system components to be measured by the sensors by the aligning and misaligning of the magnets within the rotors of the perturbator.

Implementations of the present disclosure are primarily discussed in the context of perturbation generation systems, but can be used for drive systems where the magnets couple mechanical elements in drive trains or where magnets can be used to detect misalignment of system components rotating at different speeds.

Figure 1:
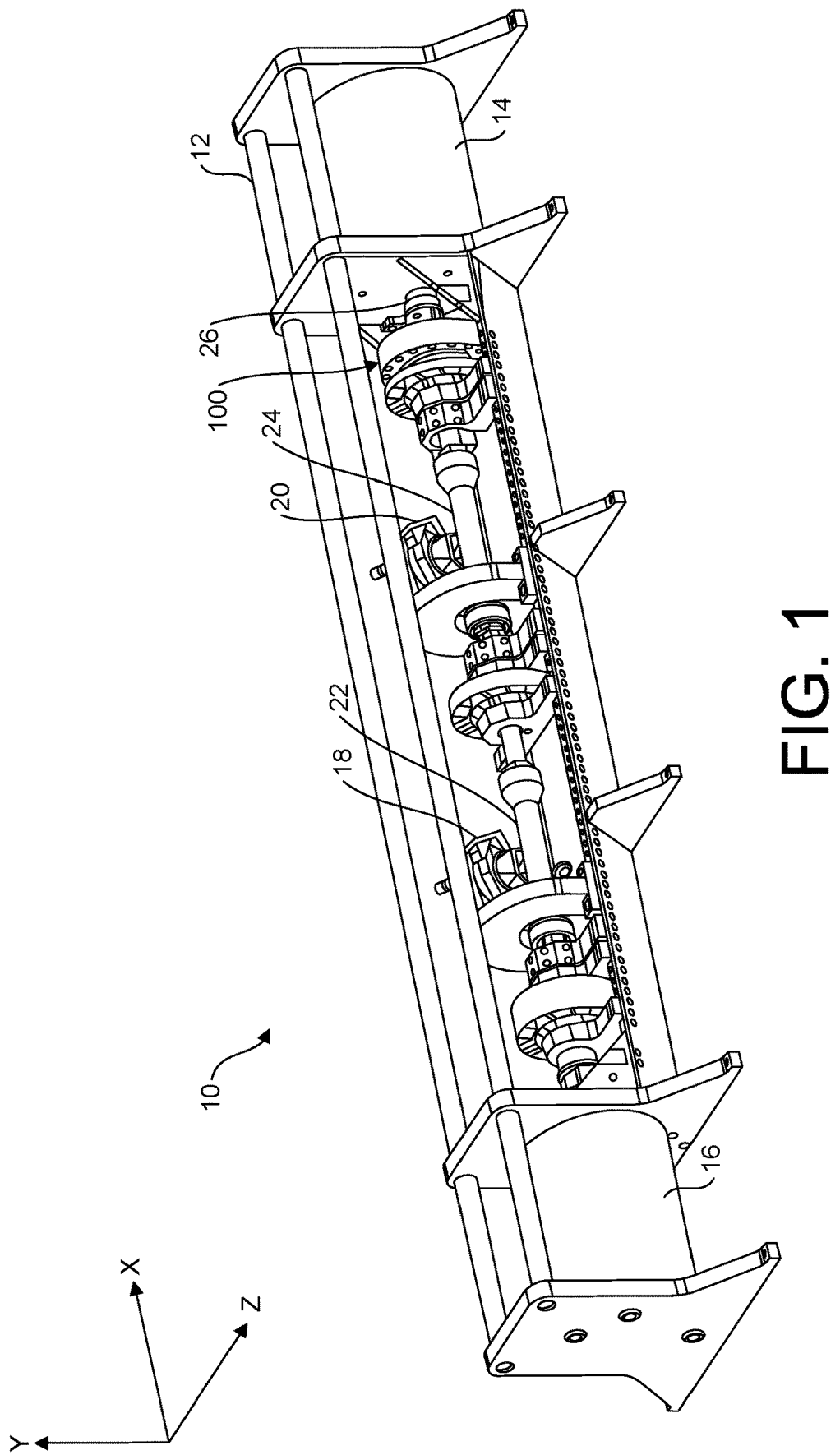
FIG. 1 is a perspective view illustrating one exemplary implementation of a perturbator system including a perturbator.

FIG. 1 illustrates one exemplary implementation of a perturbator system 10 containing a frame 12. The system 100 also can include a drive motor 14, a drive motor 16, a sensor 18, a sensor 20, a shaft 22, a shaft 24, and a shaft 26. The sensors 18, 20 can be used to determine torsional, axial, and radial perturbations through the shafts 22, 24 due to the perturbator 100. As described below, the perturbator 100 can generate axial and torsional perturbations through the shafts 22, 24 due to magnets arranged within the perturbator 100. The perturbator 100 can include two separate rotors which can be rotated relative to one another, with one rotor being driven by the drive motor 14 via shafts 22, 24, and the other rotor being driven by the drive motor 16 via the shaft 26. The frame 12 can support additional components within the system 100 to allow for the testing and calibration of the sensors 18, 20. In an exemplary implementation, the drive motors 14 and 16 can rotate in similar and/or opposite directions in order to create the required frequency of perturbations.

Figure 2:
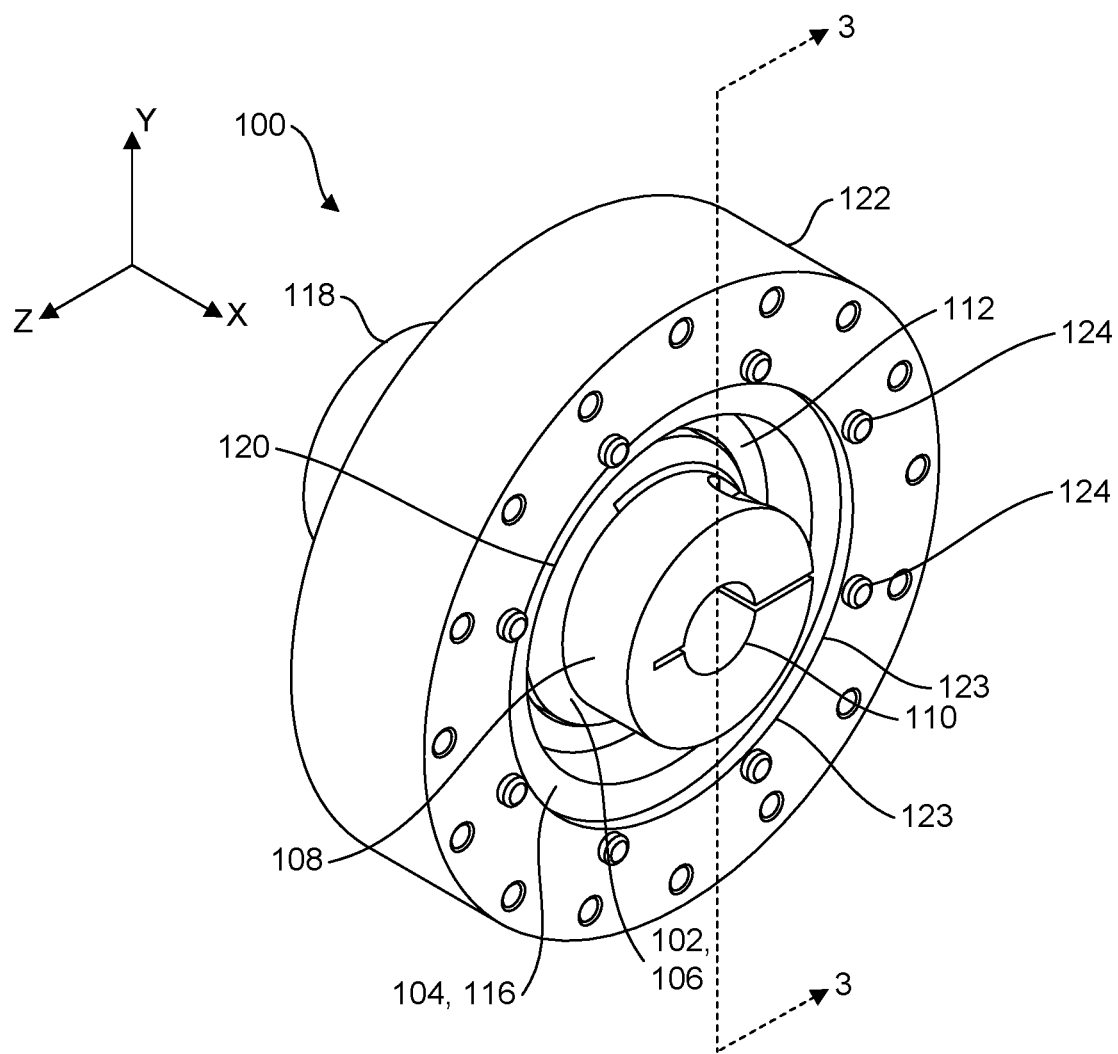
FIG. 2 is a perspective view illustrating one exemplary implementation of the perturbator of FIG. 1.

FIG. 2 illustrates one exemplary implementation of the perturbator 100 of FIG. 1. The perturbator 100 can include an inner rotor 102 and an outer rotor 104. In an exemplary implementation, the inner rotor 102 is concentrically arranged within the outer rotor 104 and can rotate relative to the outer rotor 104. Additionally, the inner rotor 102 can rotate relative to the outer rotor 104. The inner rotor 102 can include a body 106 and a hub 108, where the hub 108 can be configured to non-rotatably secure the inner rotor 102 to the shaft 26. The hub 108 can include an aperture 110 which the shaft 26 can be inserted in to order to transmit rotational power from the drive motor 14 to the inner rotor 102. Additionally, the inner rotor 102 can include a cover 112, which can be secured to the outer surface of the body 106 of the inner rotor 102. In an exemplary implementation, the cover 112 can be used to further secure magnets within the body 106 of the inner rotor 102 during rotation of the inner rotor 102 due to a centrifugal force. The cover 112 can also be concentrically arranged within the outer rotor 104 and secured to the inner hub 102 via screws 114.

In addition to the inner hub 102, the outer hub 104 can include a body 116 and a hub 118, where the hub 118 can be configured to non-rotatably secure the outer rotor 104 to the shaft 24. The hub 118 can include an aperture (not shown) which the shaft 24 can be inserted in to order to transmit rotational power from the drive motor 16 to the outer rotor 104. The body 116 can include an aperture 122, which can allow the inner hub 102 to be concentrically arranged within the outer hub 104. Additionally, the outer rotor 104 can include a cover 122, which can be secured to the outer surface of the body 116 of the outer rotor 104. The cover 122 can include an aperture 123 to allow the inner rotor 102 to be inserted within the outer rotor 104. In an exemplary implementation, the cover 122 can be used to further secure magnets within the body 116 of the outer rotor 104 during rotation of the outer rotor 104 due to a centrifugal force. The cover 122 can be secured to the outer rotor 104 via screws 124.

Figure 3:
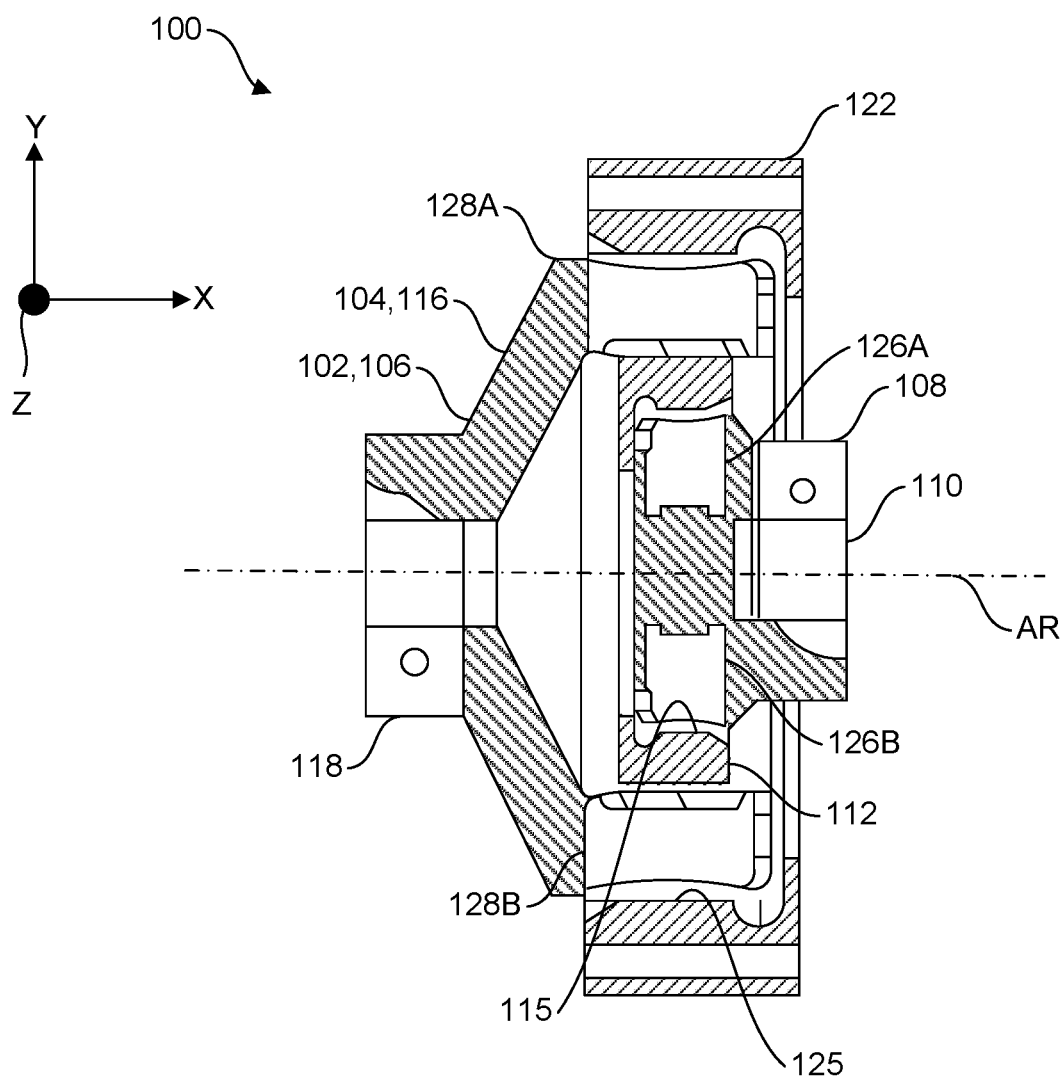
FIG. 3 is a cross-sectional view taken along line 3-3 in FIG. 2 illustrating the perturbator of FIG. 2.

FIG. 3 illustrates a cross-sectional view taken along line 3-3 in FIG. 2, and depicts the concentric arrangement of the inner hub 102 and the outer hub 104. In an exemplary implementation, the inner hub 102 can include magnet 126A and magnet 126B arranged within the body 106 of the inner hub, and the outer hub 104 can include magnet 128A and magnet 128B arranged within the body 116 of the outer hub 104. The magnet 126A can be arranged 180° relative to the magnet 126B on the inner rotor 102. Additionally, the magnet 128A can be arranged 180° relative to the magnet 128B on the outer rotor 104. As depicted in FIG. 3, the magnets 126A, 126B, 128A, 128B can be arranged within the same axial plane along the axis of rotation AR. In some embodiments, the magnets within the hubs are permanent magnets with a set pole orientation and magnetic field strength. In other embodiments, the magnets within the hubs are electromagnets which can vary in pole orientation and magnetic field strength. The electromagnets are configured to alter the pole orientation and magnetic field strength in order to test varying radial, axial, and torsional forces between the two hubs without changing the magnets within the hubs. The electromagnets are powered by an external power source (not shown) which can be integral with the system or arranged external.

As the magnets 126A, 126B align with the magnets 128A, 128B, respectively, a torque force is generated between the inner rotor 120 and the outer rotor 104 as the similar and/or opposite poles of the magnets 126A, 126B, 128A, 128B align with one another. In an exemplary implementation, an alignment of similar magnetic poles can produce a torque force in a first rotational direction since the inner rotor 102 is repelled relative to the outer rotor 104 in the first rotational direction. Additionally, an alignment of opposite magnetic poles can produce a torque force in a second rotational direction, opposite the first direction, since the inner rotor 102 is stable when the opposite magnetic poles of the magnets 126A, 126B, 128A, 128B are aligned and attracted to alignment with the outer rotor 104. Since the inner rotor 102 is stable when opposite magnetic poles are aligned, as the inner rotor 102 and the outer rotor 104 are further rotated by the drive motors 14, 16, the inner rotor 102 and outer rotor 104 will generate a torque force in the second rotational direction.

Figure 4:
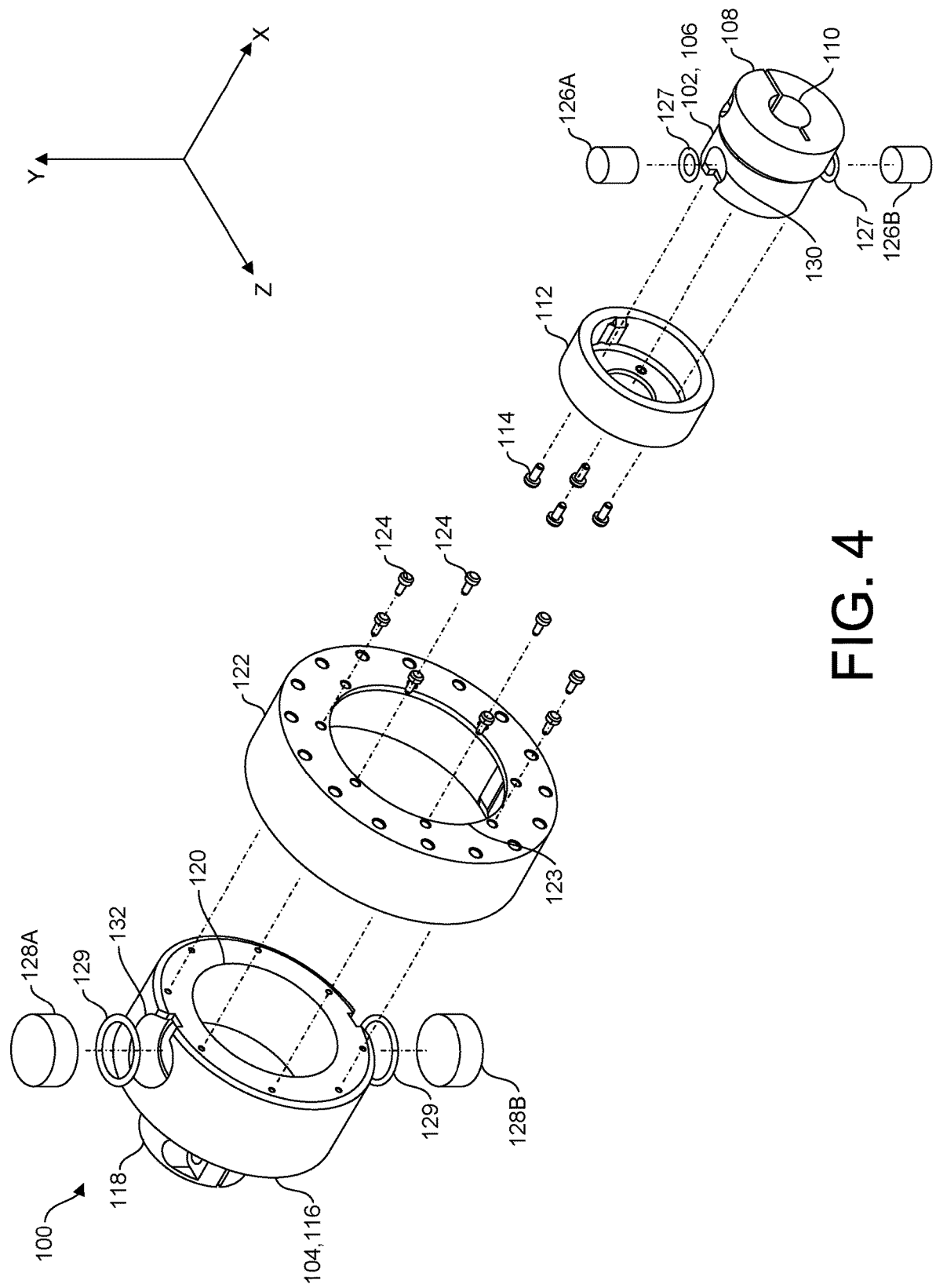
FIG. 4 is an exploded perspective view illustrating the perturbator of FIG. 2.

FIG. 4 illustrates an exploded view of the perturbator 100. In an exemplary implementation, the magnets 126A, 126B are secured within partial through-bores 130 within the body 106 of the inner rotor 102. The partial through-bores 130 can be configured to arrange the magnetic poles of the magnets 126A, 126B perpendicular to the axis of rotation AR. Additionally, rings 127 can be inserted into each partial through-bore 130 prior to the magnets 126A, 126B in order to cushion the magnets 126A, 126B against the inner hub 102. The rings 127 can also apply a force to the magnets 126A, 126B perpendicular to the axis of rotation AR, which would encapsulate the magnets 126A, 126B between the body 106 and the cover 112 to prevent the magnets 126A, 126B from shifting during rotation of the inner hub 102.

Similar to the inner rotor 102, the outer rotor 104 secures the magnets 128A, 128B in a substantially similar form. In an exemplary implementation, the magnets 128A, 128B are secured within partial through-bores 132 within the body 116 of the outer rotor 104. The partial through-bores 132 can be configured to arrange the magnetic poles of the magnets 128A, 128B perpendicular to the axis of rotation AR. Additionally, rings 129 can be inserted into each partial through-bore 132 prior to the magnets 128A, 128B in order to cushion the magnets 128A, 128B against the outer hub 104. The rings 129 can also apply a force to the magnets 128A, 128B perpendicular to the axis of rotation AR, which would encapsulate the magnets 128A, 128B between the body 116 and the cover 122 to prevent the magnets 128A, 128B from shifting during rotation of the outer rotor 104.

Figure 5:
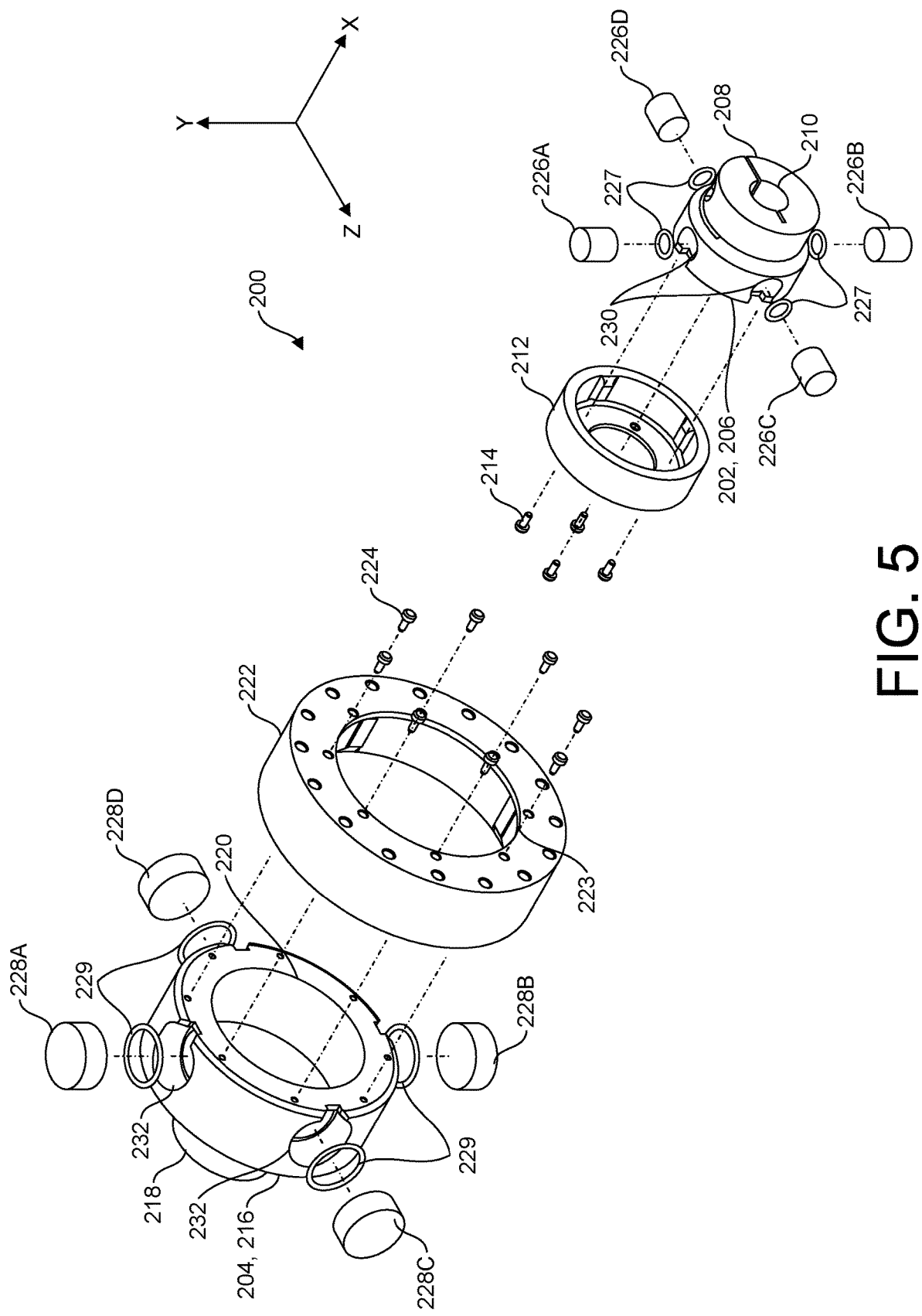
FIG. 5 is an exploded perspective view illustrating another exemplary implementation of a perturbator.

Even though the perturbator 100 is depicted with only four magnets, it is possible to include additional magnets in both the inner rotor and outer rotor in order to increase the stable and unstable nodes of the perturbator. FIG. 5 illustrates an exploded view of another exemplary implementation of a perturbator 200. The perturbator 200 is substantially similar to the perturbator 100 except for the amount and location of the magnets within the inner rotor and outer rotor. In an exemplary implementation, the magnets 226A, 226B, 226C, 226D are secured within partial through-bores 230 within the body 206 of the inner rotor 202. The partial through-bores 230 can be configured to arrange the magnetic poles of the magnets 226A, 226B, 226C, 226D perpendicular to the axis of rotation AR. Additionally, rings 227 can be inserted into each partial through-bore 230 prior to the magnets 226A, 226B, 226C, 226D in order to cushion the magnets 226A, 226B, 226C, 226D against the inner hub 202. The rings 227 can also apply a force to the magnets 226A, 226B, 226C, 226D perpendicular to the axis of rotation AR, which would encapsulate the magnets 226A, 226B, 226C, 226D between the body 206 and the cover 212 to prevent the magnets 226A, 226B, 226C, 226D from shifting during rotation of the inner hub 202.

Similar to the inner rotor 202, the outer rotor 204 secures the magnets 228A, 228B, 228C, 228D in a substantially similar form. In an exemplary implementation, the magnets 228A, 228B, 228C, 228D are secured within partial through-bores 232 within the body 216 of the outer rotor 204. The partial through-bores 232 can be configured to arrange the magnetic poles of the magnets 228A, 228B, 228C, 228D perpendicular to the axis of rotation AR. Additionally, rings 229 can be inserted into each partial through-bore 232 prior to the magnets 228A, 228B, 228C, 228D in order to cushion the magnets 228A, 228B, 228C, 228D against the outer hub 204. The rings 229 can also apply a force to the magnets 228A, 228B, 228C, 228D perpendicular to the axis of rotation AR, which would encapsulate the magnets 228A, 228B, 228C, 228D between the body 216 and the cover 222 to prevent the magnets 228A, 228B, 228C, 228D from shifting during rotation of the outer rotor 204. With the addition of the magnets 226C, 226D, 228C, 228D, there are is an additional stable and unstable node in order to generate perturbations during rotation of the perturbator 200 compared to the perturbator 100.

Figure 6:
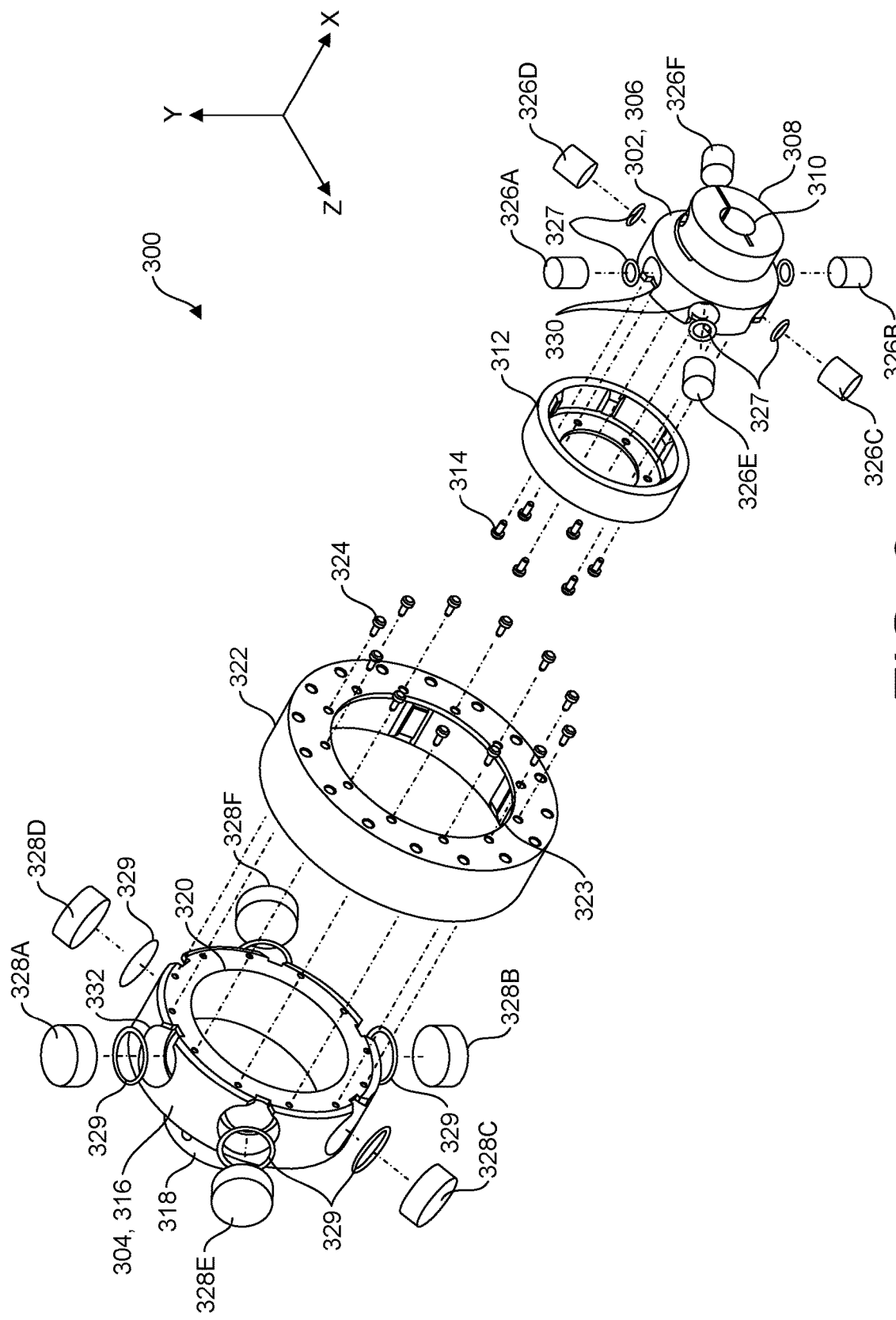
FIG. 6 is an exploded perspective view illustrating another exemplary implementation of a perturbator.

FIG. 6 illustrates an exploded view of another exemplary implementation of a perturbator 300. The perturbator 300 is substantially similar to the perturbators 100, 200 except for the amount and location of the magnets within the inner rotor and outer rotor. In an exemplary implementation, the magnets 326A, 326B, 326C, 326D, 326E, 326F are secured within partial through-bores 330 within the body 306 of the inner rotor 302. The partial through-bores 330 can be configured to arrange the magnetic poles of the magnets 326A, 326B, 326C, 326D, 326E, 326F perpendicular to the axis of rotation AR. Additionally, rings 327 can be inserted into each partial through-bore 330 prior to the magnets 326A, 326B, 326C, 326D, 326E, 326F in order to cushion the magnets 326A, 326B, 326C, 326D, 326E, 326F against the inner hub 302. The rings 327 can also apply a force to the magnets 326A, 326B, 326C, 326D, 326E, 326F perpendicular to the axis of rotation AR, which would encapsulate the magnets 326A, 326B, 326C, 326D, 326E, 326F between the body 306 and the cover 312 to prevent the magnets 326A, 326B, 326C, 326D, 326E, 326F from shifting during rotation of the inner hub 302.

Similar to the inner rotor 302, the outer rotor 304 secures the magnets 328A, 328B, 328C, 328D, 328E, 328F in a substantially similar form. In an exemplary implementation, the magnets 328A, 328B, 328C, 328D, 328E, 328F are secured within partial through-bores 332 within the body 316 of the outer rotor 304. The partial through-bores 332 can be configured to arrange the magnetic poles of the magnets 328A, 328B, 328C, 328D, 328E, 328F perpendicular to the axis of rotation AR. Additionally, rings 329 can be inserted into each partial through-bore 332 prior to the magnets 328A, 328B, 328C, 328D, 328E, 328F in order to cushion the magnets 328A, 328B, 328C, 328D, 328E, 328F against the outer hub 304. The rings 329 can also apply a force to the magnets 328A, 328B, 328C, 328D, 328E, 328F perpendicular to the axis of rotation AR, which would encapsulate the magnets 328A, 328B, 328C, 328D, 328E, 328F between the body 316 and the cover 322 to prevent the magnets 328A, 328B, 328C, 328D, 328E, 328F from shifting during rotation of the outer rotor 304. With the addition of the magnets 326E, 326F, 328E, 328F, there are is an additional stable and unstable node in order to generate perturbations during rotation of the perturbator 300 compared to the perturbator 200.

Figure 7:
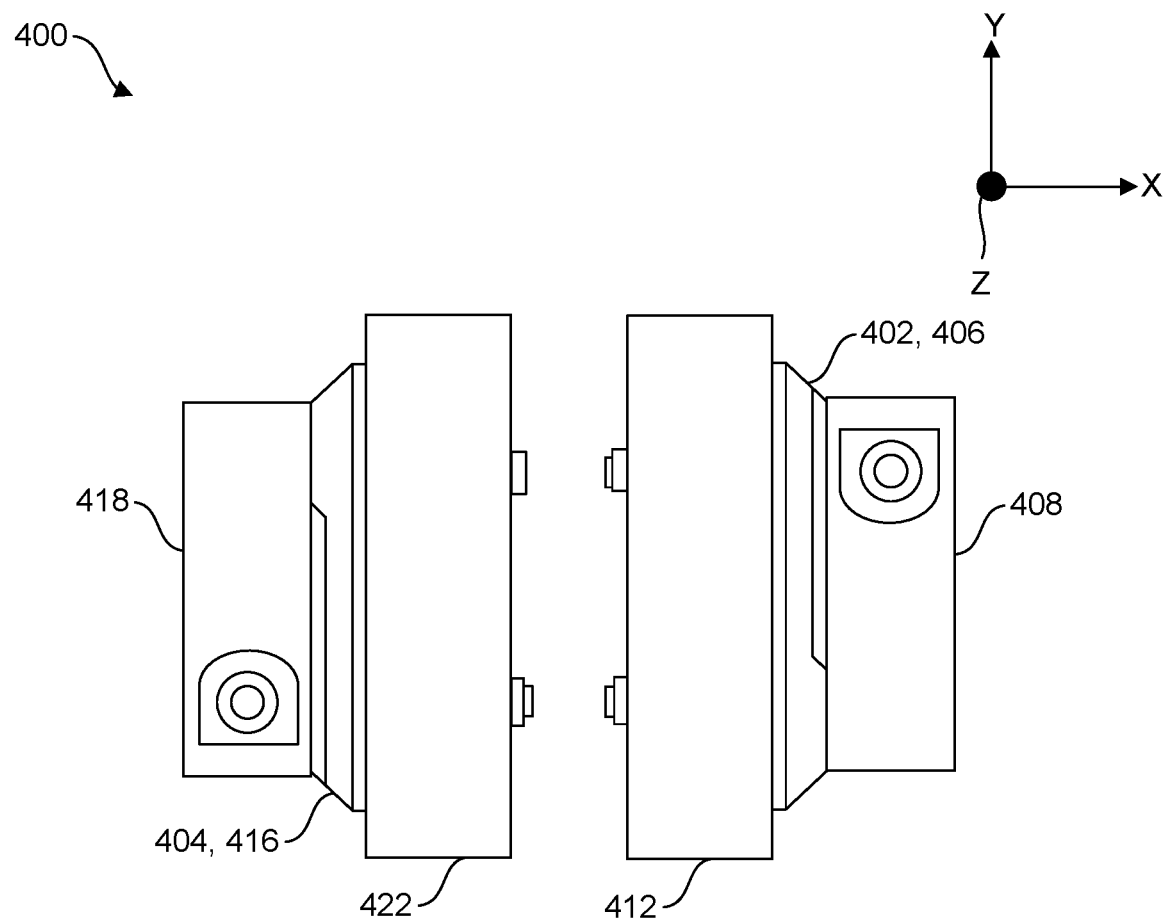
FIG. 7 is a side view illustrating another exemplary implementation of a perturbator.
Figure 8:
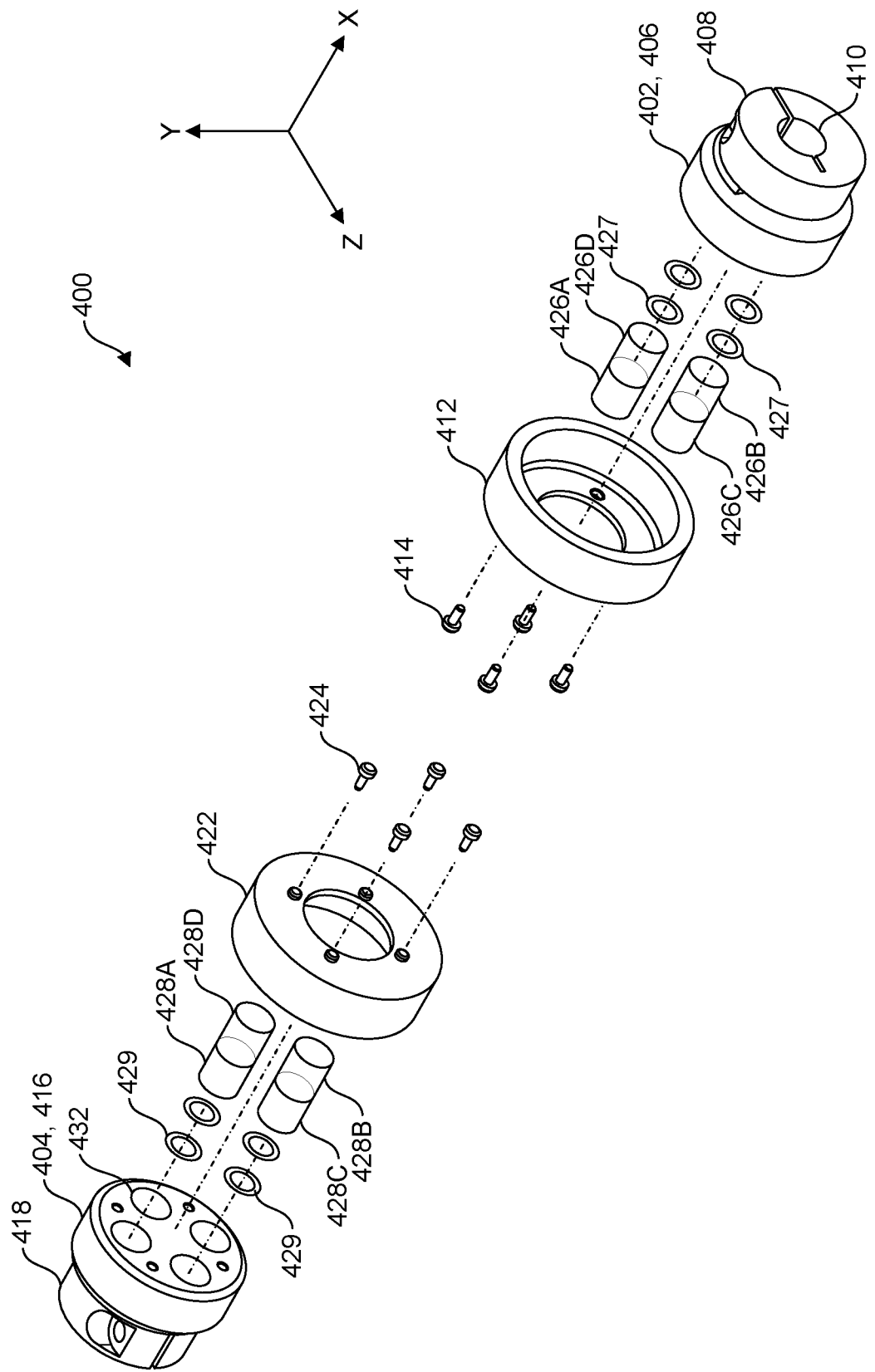
FIG. 8 is an exploded perspective view illustrating the perturbator of FIG. 7.

In addition to producing a torque along the shafts connected to the perturbator, a perturbator can also be configured to produce an axial force along the shafts by arranging the magnets within the perturbator. FIGS. 7-8 illustrate an exemplary implementation of a perturbator 400 which produces an axial force between the rotors of the perturbator 400. The perturbator can include a rotor 402 and a rotor 404. The rotors 402 and 404 can be substantially similar to one another. The rotor 402 can include a body 406, a hub 408, and a cover 412. The body 406 can include partial through-bores (not shown) which can house the magnets 426A, 426B, 426C, 426D. The hub 408 includes an aperture 410 for non-rotatably connecting the rotor 402 to a rotating shaft. In an exemplary implementation, the magnets 426A, 426B, 426C, 426D are secured within the partial through-bores within the body 406 of the rotor 402. The partial through-bores can be configured to arrange the magnetic poles of the magnets 426A, 426B, 426C, 426D parallel to the axis of rotation AR. Additionally, rings 427 can be inserted into each partial through-bore prior to the magnets 426A, 426B, 426C, 426D in order to cushion the magnets 426A, 426B, 426C, 426D against the rotor 402. The rings 427 can also apply a force to the magnets 426A, 426B, 426C, 426D parallel to the axis of rotation AR, which would encapsulate the magnets 426A, 426B, 426C, 426D between the body 406 and the cover 412 to prevent the magnets 426A, 426B, 426C, 426D from shifting during rotation of the rotor 402.

Similar to the rotor 402, the rotor 404 secures the magnets 428A, 428B, 428C, 428D in a substantially similar form. In an exemplary implementation, the magnets 428A, 428B, 428C, 428D are secured within partial through-bores 432 within the body 416 of the rotor 404. The partial through-bores 432 can be configured to arrange the magnetic poles of the magnets 428A, 428B, 428C, 428D parallel to the axis of rotation AR. Additionally, rings 429 can be inserted into each partial through-bore 432 prior to the magnets 428A, 428B, 428C, 428D in order to cushion the magnets 428A, 428B, 428C, 428D against the rotor 404. The rings 429 can also apply a force to the magnets 428A, 428B, 428C, 428D perpendicular to the axis of rotation AR, which would encapsulate the magnets 428A, 428B, 428C, 428D between the body 416 and the cover 422 to prevent the magnets 428A, 428B, 428C, 428D from shifting during rotation of the rotor 404.

In an exemplary implementation, due to the arrangement of the magnets 426A, 426B, 426C, 426D, 428A, 428B, 428C, 428D, as the rotors 402, 404 rotate relative to one another, an alignment of similar magnetic poles can produce an axial force in a first axial direction, parallel to the axis of rotation AR, since the rotor 402 is repelled relative to the outer rotor 404. Additionally, an alignment of opposite magnetic poles can produce an axial force in a second axial direction, opposite the first direction, since the rotor 402 is attracted to the rotor 404 when the opposite magnetic poles of the magnets are aligned.

Figure 9:
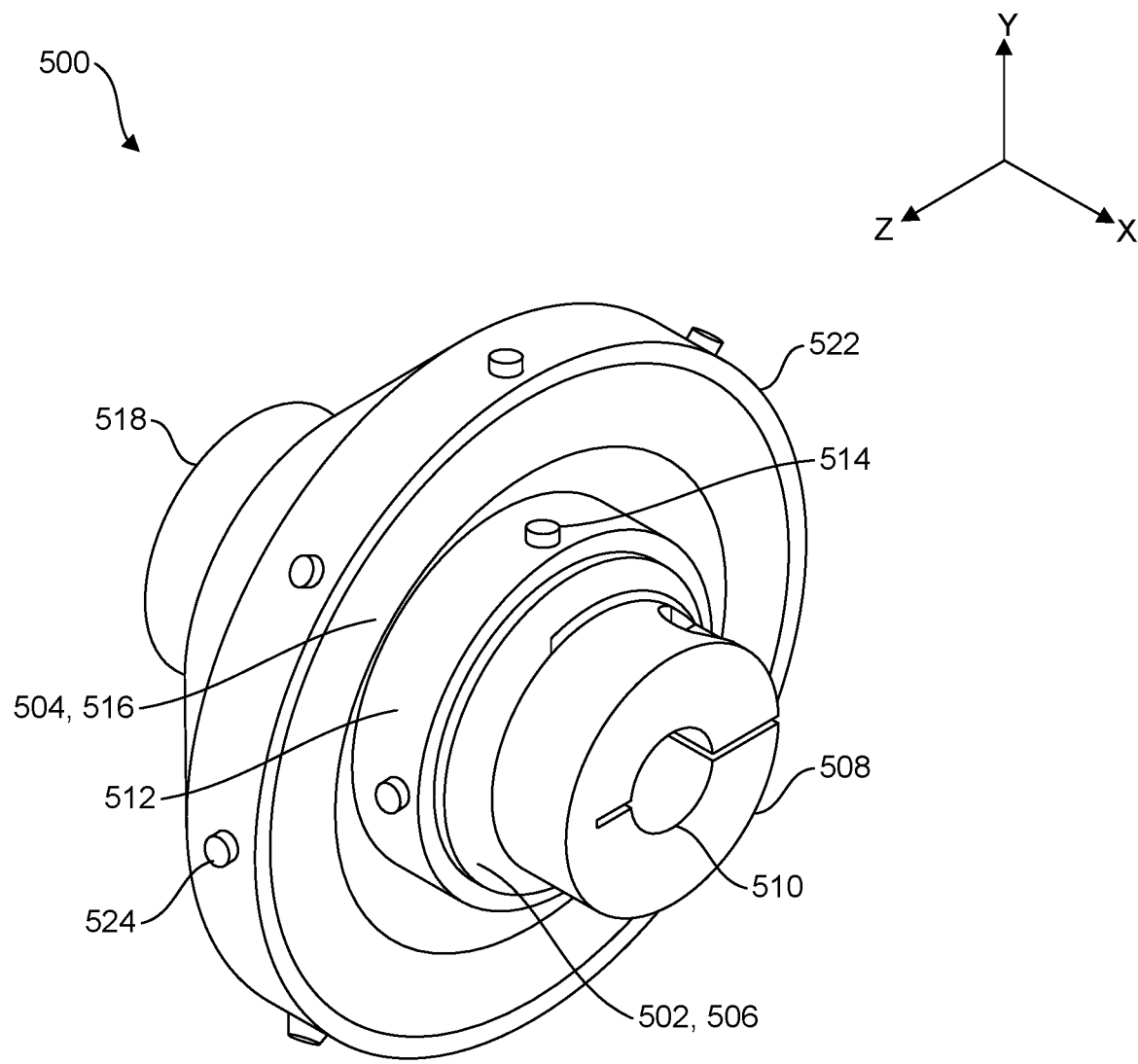
FIG. 9 is a perspective view illustrating another exemplary implementation of a perturbator.
Figure 10:
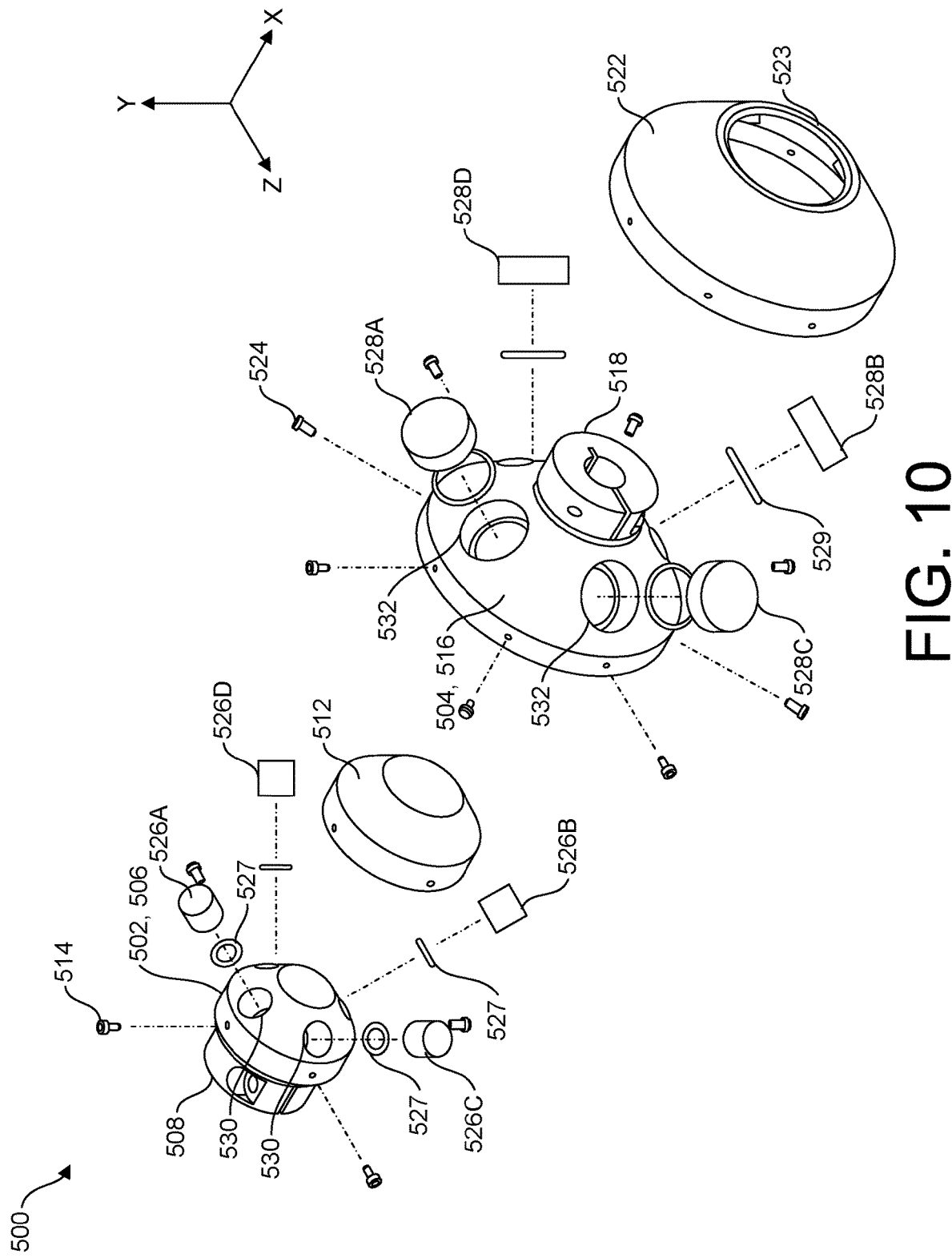
FIG. 10 is an exploded perspective view illustrating the perturbator of FIG. 9.

In addition to producing a single torque force and a single axial force along the shafts connected to the perturbator, a perturbator can also be configured to produce both an axial force and a torque force along the shafts by arranging the magnets within the perturbator. FIGS. 9-10 illustrate an exemplary implementation of a perturbator 500 which produces an axial force and a torque force between the rotors of the perturbator 500. The perturbator 500 can include an inner rotor 502 and an outer rotor 504. In an exemplary implementation, the inner rotor 502 and the outer rotor 504 are both conically shaped in order to place the magnetic poles of the magnets within the inner rotor 501 and outer rotor 504 at an angle relative to the axis of rotation AR.

The inner rotor 502 can include a body 506, a hub 508, and a cover 512. The body 506 can include partial through-bores 530 which can house the magnets 526A, 526B, 526C, 526D. The hub 508 includes an aperture for non-rotatably connecting the inner rotor 502 to a rotating shaft. In an exemplary implementation, the magnets 526A, 526B, 526C, 526D are secured within the partial through-bores 530 within the body 506 of the inner rotor 502. The partial through-bores 530 can be configured to arrange the magnetic poles of the magnets 526A, 526B, 526C, 526D at an angle relative to the axis of rotation AR along the X-axis. By placing the magnetic poles at an angle between 0° and 90°, both an axial force and a torque force can be generated simultaneously on the rotors 502, 504.

Additionally, rings 527 can be inserted into each partial through-bore 530 prior to the magnets 526A, 526B, 526C, 526D in order to cushion the magnets 526A, 526B, 526C, 526D against the inner rotor 502. The rings 527 can also apply a force to the magnets 526A, 526B, 526C, 526D, which would encapsulate the magnets 526A, 526B, 526C, 526D between the body 506 and the cover 512 to prevent the magnets 526A, 526B, 526C, 526D from shifting during rotation of the rotor 502.

Similar to the inner rotor 502, the outer rotor 504 secures the magnets 528A, 528B, 528C, 528D in a substantially similar form. In an exemplary implementation, the magnets 528A, 528B, 528C, 528D are secured within partial through-bores 532 within the body 516 of the outer rotor 504. The partial through-bores 532 can be configured to arrange the magnetic poles of the magnets 528A, 528B, 528C, 528D at an angle relative to the axis of rotation AR. Additionally, rings 529 can be inserted into each partial through-bore 532 prior to the magnets 528A, 528B, 528C, 528D in order to cushion the magnets 528A, 528B, 528C, 528D against the rotor 504. The rings 529 can also apply a force to the magnets 528A, 528B, 528C, 528D, which would encapsulate the magnets 528A, 528B, 528C, 528D between the body 516 and the cover 522 to prevent the magnets 528A, 528B, 528C, 528D from shifting during rotation of the outer rotor 504.

In an exemplary implementation, due to the arrangement of the magnets 526A, 526B, 526C, 526D, 528A, 528B, 528C, 528D, as the rotors 502, 504 rotate relative to one another, an alignment of similar magnetic poles can produce an axial force and a torque force simultaneously, since the inner rotor 502 is repelled relative to the outer rotor 404. Additionally, an alignment of opposite magnetic poles can produce an axial force and a torque force, since the inner rotor 502 is attracted to the rotor 504 when the opposite magnetic poles of the magnets are aligned.

Figure 11:
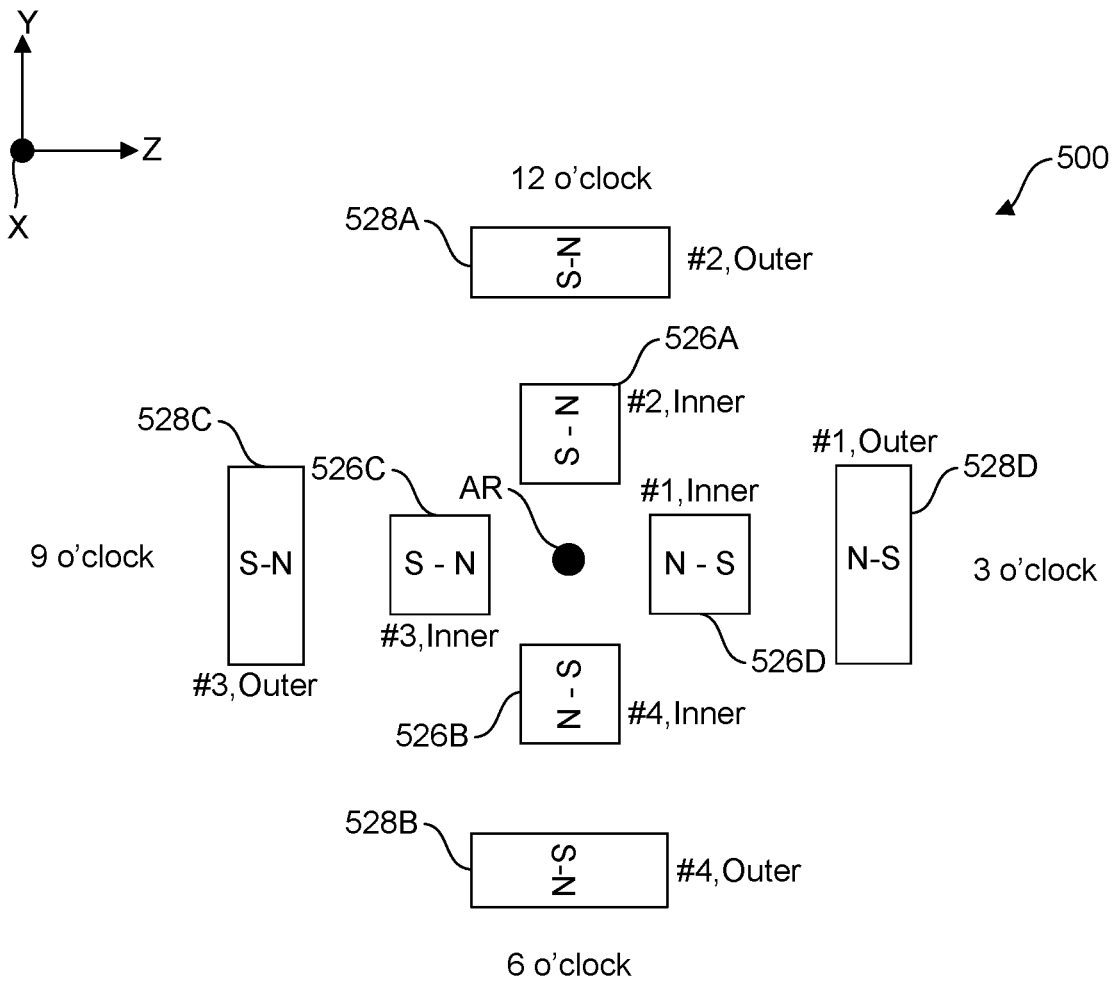
FIG. 11 is a schematic view illustrating the perturbator of FIG. 9.

FIG. 11 illustrates a schematic view of the magnetic poles of the perturbator 500 in a stable state. As depicted, the N pole of the magnet 526A is aligned with the S pole of the magnet 528A, the N pole of the magnet 526B is aligned with the S pole of the magnet 528B, the S pole of the magnet 526C is aligned with the N pole of the magnet 528C, and the S pole of the magnet 526D is aligned with the N pole of the magnet 528D. Due to the alignment of the magnets, as the inner rotor rotates relative to the outer rotor, the inner rotor can resist the rotation of the inner rotor since the magnets of the perturbator 500 want to stay aligned. However, since the drive motors 14, 16 can overcome the magnetic strength of the magnets, a torque can be applied in an opposite direction of rotation. This opposite torque force applied to the shaft is represented in graph 506 by line 508 of FIG. 12. Additionally, the radial force applied to the shaft by the magnets is represented by graph 502 by line 504. Lines 504 and 508 depict the change in both torque force and radial force as the magnets rotate 360° about each other.

Figure 12:
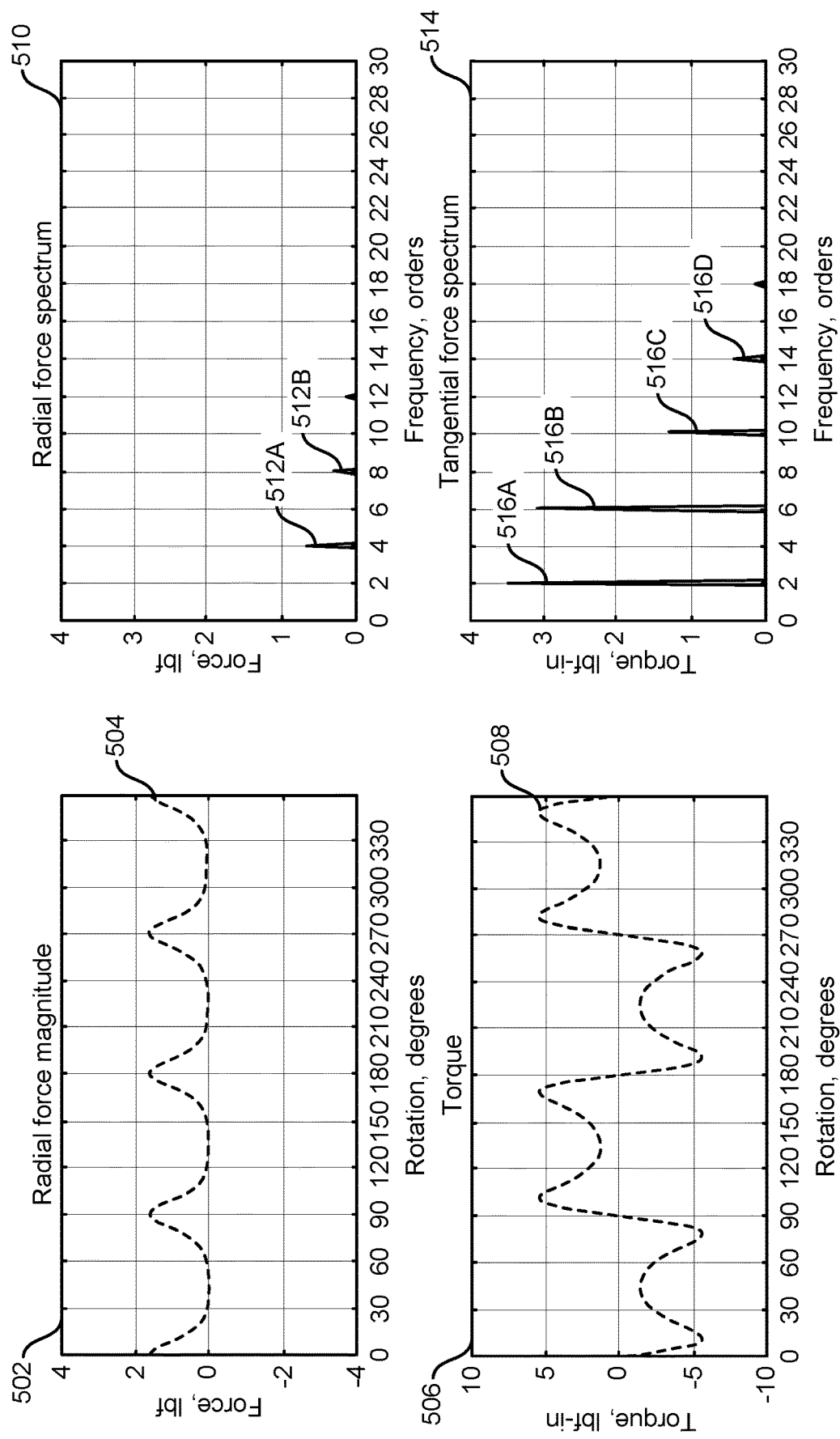
FIG. 12 illustrates the radial force and torque of the perturbator of FIG. 11.

As illustrated in FIG. 12, graphs 510 and 514 illustrate the frequency components in the radial and tangential (torque) direction, respectively, of FIG. 11. While the system is in use, a user will want to be able to precisely control excitation of either the radial or the torque loads independently. In the configuration illustrated in FIG. 11, the spectral components 512A, 512B in graph 510, and the spectral components 516A, 516B, 516C, 516D in graph 514 have no overlap, so there is complete separation between the radial and torque components (in signal processing terms the radial and torque components are orthogonal). The result is the ability to excite distinct radial and torsional response with a single perturbator. This allows the system to test radial and torque perturbation at the same time without getting cross-coupling between the two forces, eliminating the need for an additional perturbator.

Figure 13:
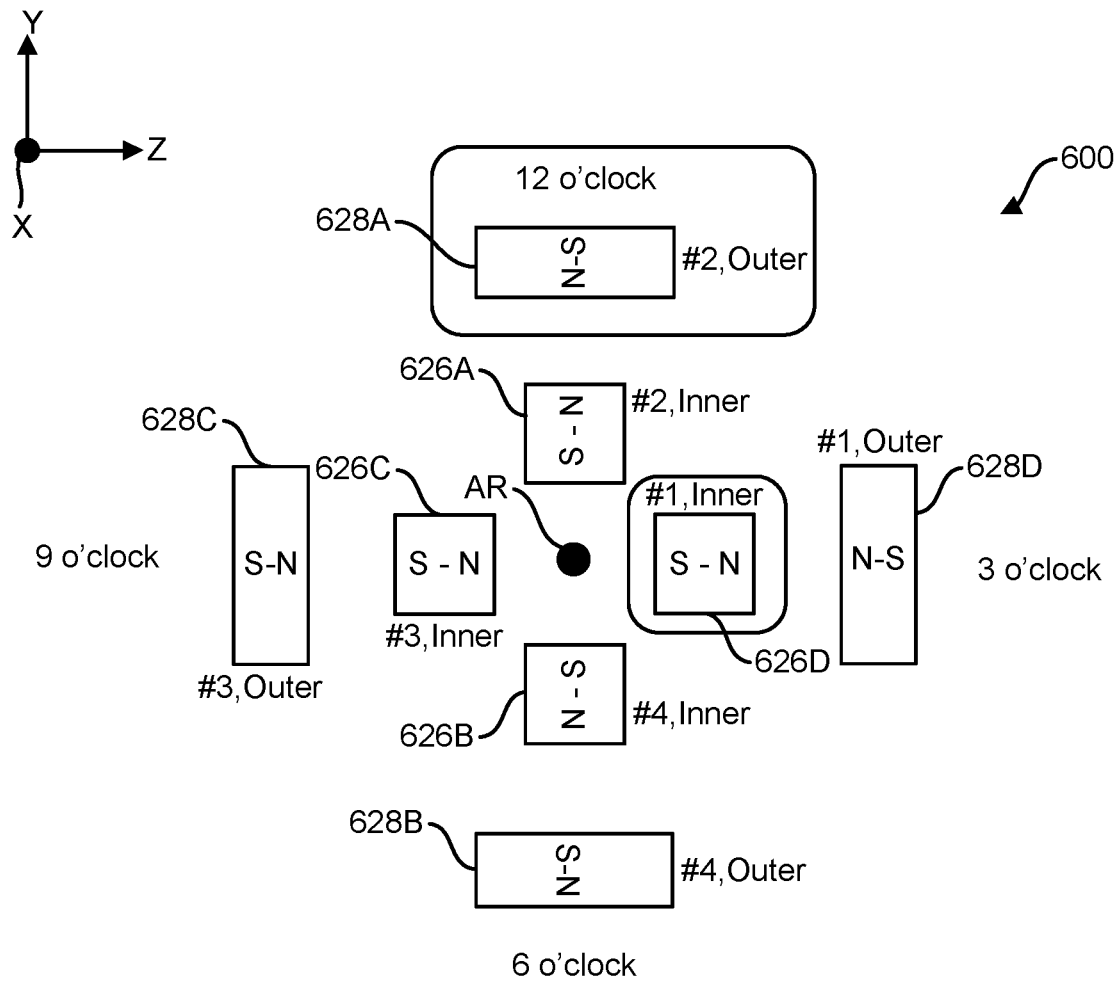
FIG. 13 is a schematic view illustrating another exemplary embodiment of the perturbator of FIG. 9.

FIG. 13 illustrates a schematic view of another exemplary implementation of the magnetic poles of the perturbator 600. As depicted, the N pole of the magnet 526A is aligned with the N pole of the magnet 528A, the N pole of the magnet 526B is aligned with the S pole of the magnet 528B, the S pole of the magnet 526C is aligned with the N pole of the magnet 528C, and the N pole of the magnet 526D is aligned with the N pole of the magnet 528D. Due to the alignment of the magnets, as the inner rotor rotates relative to the outer rotor, the inner rotor can resist the rotation of the inner rotor since the magnets of the perturbator want to stay aligned. However, since the drive motors 14, 16 can overcome the magnetic strength of the magnets, a torque can be applied in an opposite direction of rotation. This opposite torque force applied to the shaft is represented in graph 526 by line 528 of FIG. 12. Additionally, the radial force applied to the shaft by the magnets is represented by graph 522 by line 524. Lines 524 and 528 depict the change in both torque force and radial force as the magnets rotate 360° about each other. Compared to the graphs 502, 506, it is illustrated that due to the arrangement of the magnets, the radial force applied to the shaft by the perturbator 600 is more than double the arrangement of the perturbator 500. Additionally, the torque force is only applied to the shaft at one alignment phase, where magnet 626C is aligned with magnet 628A, magnet 626A is aligned with magnet 628D, magnet 626D is aligned with magnet 628B, and magnet 626B is aligned with magnet 628C.

Figure 14:
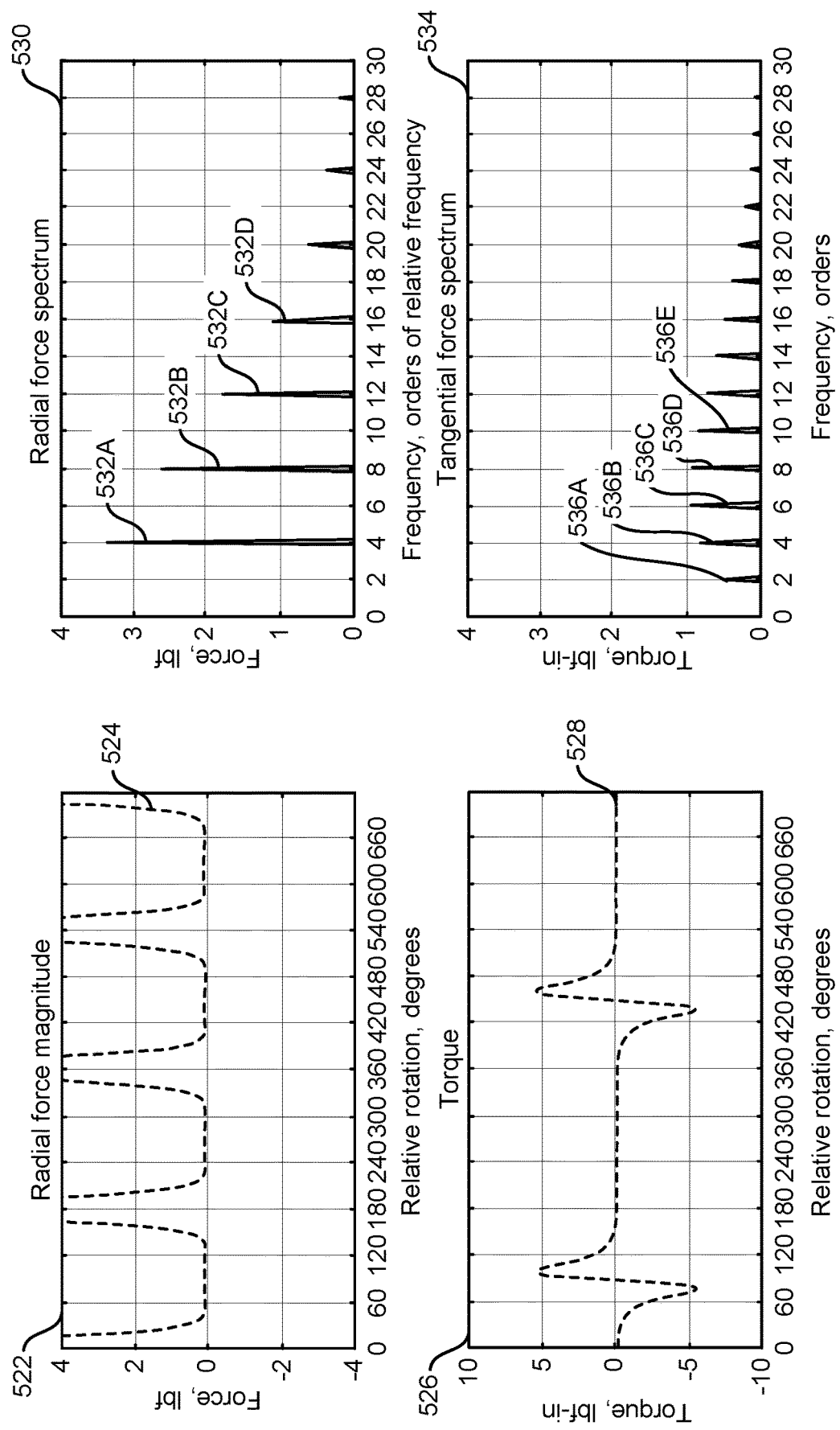
FIG. 14 illustrates the radial force and torque of the perturbator of FIG. 13.

FIG. 14 illustrates the frequency components in the radial and tangential (torque) direction, respectively, of FIG. 13. Graphs 530 and 534 illustrate an overlap of these spectral forces, 532A-532D and 536A-537E, so that both the radial and torque forces can be applied at the same time. For example, order #4 in the radial and order #4 in the torque have a value. This allows for the testing of the system response to cross-coupled torque and radial load. This type of force generation simulates rubbing of components when a rotating element contacts a stationary element changing the radial position and inducing torque at the same time.

Certain exemplary implementations have been described to provide an overall understanding of the principles of the structure, function, manufacture, and use of the systems, devices, and methods disclosed herein. One or more examples of these implementations have been illustrated in the accompanying drawings. Those skilled in the art will understand that the systems, devices, and methods specifically described herein and illustrated in the accompanying drawings are non-limiting exemplary implementations and that the scope of the present invention is defined solely by the claims. The features illustrated or described in connection with one exemplary implementation may be combined with the features of other implementations. Such modifications and variations are intended to be included within the scope of the present invention. Further, in the present disclosure, like-named components of the implementations generally have similar features, and thus within a particular implementation each feature of each like-named component is not necessarily fully elaborated upon.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described implementations. Accordingly, the present application is not to be limited by what has been particularly shown and described, except as indicated by the appended claims. All publications and references cited herein are expressly incorporated by reference in their entirety.

The invention claimed is:

1. A system, comprising:
    a first rotor configured to hold a first magnet and a second magnet;
    a second rotor configured to hold a third magnet and a fourth magnet,
    wherein the first rotor is rotatably arranged with the second rotor, wherein the first magnet and the second magnet are configured to interact with the third magnet and the fourth magnet to create a controllable frequency of perturbation between the first rotor and the second rotor as the first rotor rotates relative to the second rotor.

2. The system of claim 1, wherein the first rotor is arranged concentrically within the second rotor.

3. The system of claim 2, wherein the first magnet and the second magnet are configured to interact with the third and fourth magnets to create a controllable frequency of torsional perturbation.

4. The system of claim 3, wherein the first rotor is non-rotatably secured to a first rotating shaft, and the second rotor is non-rotatably secured to a second rotating shaft.

5. The system of claim 4, further comprising:
a first drive motor configured to rotate the first shaft;
a second drive motor configured to rotate the second shaft; and
a sensor configured to measure the axial, torsional, and radial forces applied to the first shaft.

6. The system of claim 2, wherein the first magnet, the second magnet, the third magnet, and the fourth magnet are arranged within a same axial plane that is perpendicular to an axis of rotation.

7. The system of claim 2, wherein the first rotor and the second rotor are conically-shaped.

8. The system of claim 7, wherein the first magnet and the second magnet are configured to interact with the third magnet and the fourth magnet to create a controllable frequency of axial perturbation and a controllable frequency of torsional perturbation.

9. The system of claim 8, wherein the first magnet, the second magnet, the third magnet, and the fourth magnet are arranged at an angle between a range of 10° to 80° from an axis of rotation.

10. The system of claim 1, wherein the first magnet, the second magnet, the third magnet, and the fourth magnet are electromagnets configured to alter each of their respective magnetic fields.

11. The system of claim 1, wherein the first rotor is arranged axially to the second rotor and the first magnet and the second magnet are configured to interact with the third magnet and the fourth magnet to create a controllable frequency of axial perturbation.

12. The system of claim 11, wherein the first magnet and the second magnet are arranged in a first axial plane, and the third magnet and the fourth magnet are arranged in a second axial plane, wherein the first axial plane is axially displaced with respect to the second axial plane.

13. The system of claim 1, wherein the first rotor further includes a fifth magnet and a sixth magnet, and the second rotor further includes a seventh magnet and an eighth magnet.

14. The system of claim 13, wherein the first magnet, the second magnet, the fifth magnet, and the sixth magnet are each arranged at an angular position 90° from each other about the first rotor, and the third magnet, the fourth magnet, the seventh magnet, and the eighth magnet are each arranged at an angular position 90° from each other about the second rotor.

15. A method, comprising:
rotating a first rotor including a first magnet and a second magnet arranged therein;
rotating a second rotor including a third magnet and a fourth magnet arranged therein;
wherein the first rotor is proximately arranged with the second rotor, wherein the first magnet and the second magnet are configured to interact with the third magnet and the fourth magnet to create a controllable frequency of perturbation between the first rotor and the second rotor as the first rotor rotates relative to the second rotor.

16. The method of claim 15, wherein the first rotor rotates in a first direction at a first speed, and the second rotor rotates in a second direction at a second speed resulting in torsional forces in a first, third, fifth force and radial forces in a second, fourth, sixth force along a frequency spectra.

17. The method of claim 16, wherein the first or second rotor is stopped.

18. The method of claim 15, wherein the pole orientation of the at least one magnet has been altered, and the first rotor rotates in a first direction at a first speed and the second rotor rotates in a second direction at a second speed resulting in torsional forces in a first, second, third force and radial forces in a second, fourth, sixth force along a frequency spectra.

19. The method of claim 18, wherein the first or second rotor is stopped.

20. The method of claim 19, wherein the first direction is opposite the second direction.

* * * * *